(12) United States Patent
Matsunaga (10) Patent No.: US 11,725,729 B2
(45) Date of Patent: Aug. 15, 2023

(54) TRANSMISSION

(71) Applicant: Honda Motor Co., Ltd., Tokyo (JP)

(72) Inventor: Naoya Matsunaga, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/668,831

(22) Filed: Feb. 10, 2022

(65) Prior Publication Data

US 2022/0316593 A1  Oct. 6, 2022

(30) Foreign Application Priority Data

Mar. 31, 2021  (JP) .................................. 2021-062211

(51) Int. Cl.
*F16H 63/32* (2006.01)
*F16H 61/682* (2006.01)

(52) U.S. Cl.
CPC ........... *F16H 63/32* (2013.01); *F16H 61/682* (2013.01)

(58) Field of Classification Search
CPC ........ F16H 63/32; F16H 61/682; F16H 63/18; F16H 3/091; F16H 2063/322; F16H 3/006; F16H 3/02; F16H 59/02
USPC ................. 74/330, 335, 337.5, 473.3, 473.36
See application file for complete search history.

(56) References Cited

U.S. PATENT DOCUMENTS 8,276,473 B2 * 10/2012 Kobayashi ............. B60K 20/04
74/473.25
2005/0087032 A1 * 4/2005 Kawakubo .............. F16H 63/18
74/473.1

2016/0281822 A1  9/2016 Adachi et al.
2017/0023134 A1 * 1/2017 Sugano ................... F16H 63/18

FOREIGN PATENT DOCUMENTS

| DE | 950 433 C | 10/1956 |
| FR | 2 582 370 A1 | 11/1986 |
| JP | 2008-298089 A | 12/2008 |
| JP | 2016-186357 A | 10/2016 |
| JP | 2017-26043 A | 2/2017 |

OTHER PUBLICATIONS

Japanese Office Action for Japanese Application No. 2021-062211, dated Apr. 4, 2023, with an English translation.
Spanish Search Report for Spanish Application No. 202230116, dated Mar. 31, 2023, with an English translation.

* cited by examiner

*Primary Examiner* — Victor L Macarthur
(74) *Attorney, Agent, or Firm* — Birch, Stewart, Kolasch & Birch, LLP (57) ABSTRACT

A transmission in which multiple shift forks are moved by a shared lead groove of a shift drum has an improved degree of freedom of design of an internal combustion engine as well as an improved degree of freedom of layout of shift forks. The transmission includes multiple shift forks having engaging protrusions that engage with a shared lead groove. At least one shift fork among the multiple shift forks has an opening angle α around a drum rotation center line of a shift drum between a boss center line as a cylindrical center line of a cylindrical boss that is axially supported by a fork shaft of the shift fork, and a fork action part of the engaging protrusion on which the shared lead groove acts in accordance with rotation of the shift drum.

8 Claims, 5 Drawing Sheets

TRANSMISSION

BACKGROUND

1. Technical Field

The present invention relates to a transmission that changes the gear ratio in accordance with change in the mutual engagement state of gear trains that are axially supported respectively by a driving shaft and a driven shaft. The mutual engagement state is changed by a shift fork that pushes a shifter as it moves with rotation of a shift drum.

2. Description of the Background

In such type of transmissions, multiple lead grooves engaging with engaging protrusions of shift forks are formed on a shift drum, and the shift fork moves as the engaging protrusion is pushed by the lead groove due to rotation of the shift drum.

Normally, an engaging protrusion of one shift fork engages with one lead groove, but there are examples in which engaging protrusions of multiple shift forks engage with one lead groove.

In one example disclosed in Patent literature 1, engaging protrusions of two shift forks engage with one shared lead groove.

CITATION LIST

Patent Literature

Patent literature 1: Japanese Unexamined Patent Application Laid-Open No. 2017-26043

A shift drum using a shared lead groove can have a reduced number of lead grooves and can be reduced in width in the axial direction.

A shared lead groove is composed of two different lead groove parts for moving two shift forks, and they are formed on an outer circumferential surface of a shift drum in a manner mutually dislocated in the circumferential direction. Engaging protrusions of the two shift forks respectively engage with the lead groove parts, resulting in requiring not a small certain amount of an opening angle between the two engaging protrusions around a drum rotation center line.

In addition, this opening angle is a multiple of a feed angle of a transmission.

For example, as to a 5- or 6-speed transmission having a feed angle of 60 degrees, this opening angle is a multiple of 60 degrees.

According to Patent literature 1, the opening angle between the two engaging protrusions around the drum rotation center line is 120 degrees.

The engaging protrusion of the shift fork usually protrudes toward the drum rotation center line from a cylindrical boss that is axially supported by a fork shaft, as disclosed in Patent literature 1.

Thus, in Patent literature 1, an opening angle around the drum rotation center line between the fork shafts that axially support the two shift forks, is set to 120 degrees.

BRIEF SUMMARY

The relative positions of the two fork shafts are conventionally determined by a predetermined amount of an opening angle between the two engaging protrusions around a drum rotation center line, as disclosed in Patent literature 1.

As a result, the degree of freedom of design of an internal combustion engine as well as the degree of freedom of layout of shift forks is limited.

The present invention has been achieved in view of these circumstances, and an object of the present invention is to improve the degree of freedom of design of an internal combustion engine as well as the degree of freedom of layout of shift forks in a transmission including multiple shift forks that are moved by a shared lead groove of a shift drum.

In order to achieve the above object, the present invention provides a transmission configured to transmit power from a driving shaft to a driven shaft at a gear ratio that is determined by a mutual engagement state of gear trains. The gear trains are axially supported respectively by the driving shaft and the driven shaft that are arranged in parallel to each other. The transmission includes shifters, dog clutches, shift forks, fork shafts, and a shift drum.

The shifters are axially supported respectively by the driving shaft and the driven shaft. The shifters are configured to rotate together with the respective shafts and be axially movable.

The dog clutches are configured to engage and disengage the shifters and gears adjacent to the respective shifters.

The shift forks are configured to push and axially move the respective shifters.

The fork shafts axially support the shift forks in an axially movable manner.

The shift drum has multiple lead grooves on a cylindrical outer circumferential surface. The lead grooves engage with engaging protrusions of the shift forks. The shift drum is configured to rotate to axially move the shift forks.

At least one of the lead grooves of the shift drum is a shared lead groove that engages with the engaging protrusions of the shift forks.

At least one of the shift forks that have the engaging protrusions engaging with the shared lead groove, has an opening angle around a drum rotation center line of the shift drum, between a boss center line as a cylindrical center line of a cylindrical boss that is axially supported by the fork shaft of the at least one shift fork, and a fork action part of the engaging protrusion on which the shared lead groove acts in accordance with rotation of the shift drum.

In this structure, at least one of the shift forks that have the engaging protrusions engaging with the shared lead groove, has an opening angle around the drum rotation center line of the shift drum, between the boss center line as the cylindrical center line of the cylindrical boss that is axially supported by the fork shaft of the at least one shift fork, and the fork action part of the engaging protrusion on which the shared lead groove acts in accordance with rotation of the shift drum. That is, the boss center line is offset from the fork action part by the opening angle. Thus, although an opening angle between the engaging protrusions around the drum rotation center line, between the fork action parts of the two engaging protrusions, is set to a predetermined amount, the position of the boss center line can be freely designed without being limited by this opening angle between the engaging protrusions. As a result, the degree of freedom of design of an internal combustion engine and the degree of freedom of layout of shift forks are improved.

In one preferred embodiment of the present invention, the shift fork has an arm, the engaging protrusion protrudes from the cylindrical boss at a base end of the arm, the shift fork also has engaging claws that are formed at top ends of the arm in a separated manner and that engage with a fork groove as an outer circumferential groove of the shifter, the engaging claws respectively have fork pushing parts for pushing the shifter, and the fork pushing parts at least partially overlap the engaging protrusion in position in a line direction of the boss center line.

In this structure, the fork pushing parts of the shift fork at least partially overlap the engaging protrusion in position in the line direction of the boss center line of the cylindrical boss. Thus, the fork pushing parts for pushing the shifter have a very small offset amount in the line direction of the boss center line, relative to the fork action part of the engaging protrusion, on which the lead groove of the shift drum acts. This structure suppresses occurrence of partial stress concentration.

In one preferred embodiment of the present invention, a shifter center line as an axial center line of the shifter, the boss center line, and the drum rotation center line are on the same straight line.

In this structure, the shifter center line as the axial center line of the shifter, the boss center line, and the drum rotation center line are on the same straight line. Thus, although there is an opening angle around the drum rotation center line between the boss center line and the fork action part, a force acting on the fork action part of the engaging protrusion of the shift fork from the lead groove of the shift drum is efficiently transmitted to the shifter by the fork pushing parts via the cylindrical boss, which centers on the boss center line on the same straight line as the straight line containing the drum rotation center line and the shifter center line.

In one preferred embodiment of the present invention, the shift forks that are moved by the shared lead groove are a first shift fork and a second shift fork, the first shift fork has an opening angle around the drum rotation center line between a first boss center line of the cylindrical boss of the first shift fork and a first fork action part of the engaging protrusion of the first shift fork, and the second shift fork has an opening angle around the drum rotation center line between a second boss center line of the cylindrical boss of the second shift fork and a second fork action part of the engaging protrusion of the second shift fork.

This structure includes the first shift fork and the second shift fork that are moved by the shared lead groove. The first shift fork has an opening angle around the drum rotation center line between the first boss center line and the first fork action part. Also, the second shift fork has an opening angle around the drum rotation center line between the second boss center line and the second fork action part. Thus, although an opening angle between the engaging protrusions around the drum rotation center line, between the fork action parts of the two engaging protrusions, is set to a predetermined amount, for example, a multiple of a shift feed angle, the positions of the first boss center line and the second boss center line can be more freely designed without being limited by this opening angle between the engaging protrusions. As a result, the degree of freedom of design of an internal combustion engine and the degree of freedom of layout of shift forks are further improved.

In one preferred embodiment of the present invention, at least one of the first boss center line and the second boss center line is disposed in an area of an opening angle between the engaging protrusions around the drum rotation center line, which is between the first fork action part of the engaging protrusion of the first shift fork and the second fork action part of the engaging protrusion of the second shift fork.

In this structure, at least one of the first boss center line and the second boss center line is disposed in the area of the opening angle between the engaging protrusions around the drum rotation center line, which is between the first fork action part and the second fork action part. Thus, at least one of the first fork shaft on the first boss center line and the second fork shaft on the second boss center line is provided in the area of the opening angle between the engaging protrusions, whereby the transmission mechanism can have a compact layout as a whole. In a case of disposing both of the first boss center line and the second boss center line in the area of the opening angle between the engaging protrusions, the transmission mechanism can have a more compact layout as a whole.

In the present invention, at least one of the shift forks that have the engaging protrusions engaging with the shared lead groove, has an opening angle around the drum rotation center line of the shift drum, between the boss center line as the cylindrical center line of the cylindrical boss that is axially supported by the fork shaft of the at least one shift fork, and the fork action part of the engaging protrusion on which the shared lead groove acts in accordance with rotation of the shift drum. That is, the boss center line is offset from the fork action part by the opening angle. Thus, although an opening angle between the engaging protrusions around the drum rotation center line, between the fork action parts of the two engaging protrusions, is set to a predetermined amount, the position of the boss center line can be freely designed without being limited by this opening angle between the engaging protrusions. As a result, the degree of freedom of design of an internal combustion engine and the degree of freedom of layout of shift forks are improved.

DETAILED DESCRIPTION

Hereinafter, a first embodiment according to the present invention will be described based on FIGS. 1 to 3.

A transmission T1 of the first embodiment is configured to be interposed in the middle of the path for transmitting to a rear wheel a driving force of an internal combustion engine mounted on a motorcycle, which is a saddled vehicle.

Figure 1:
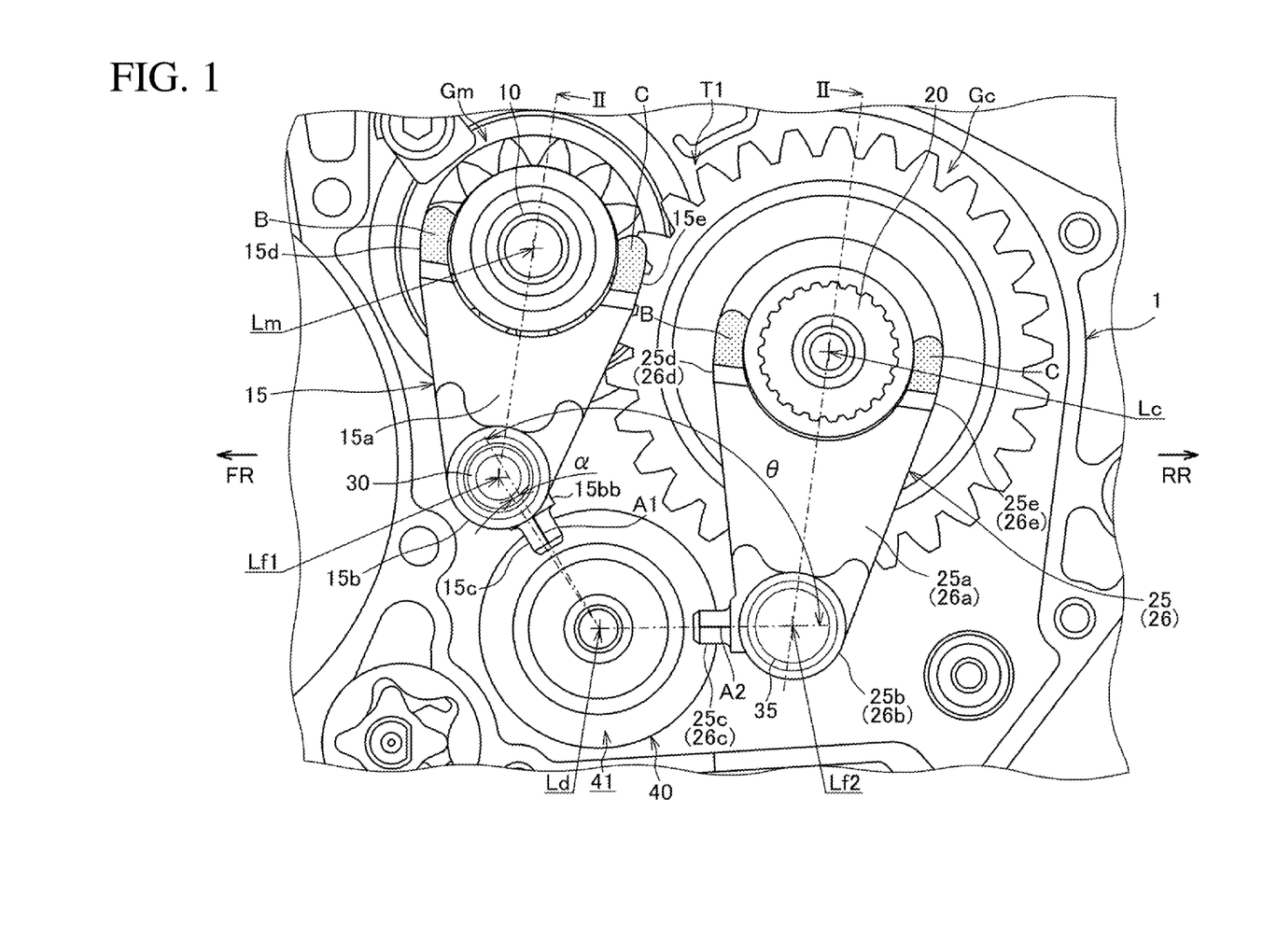
FIG. 1 is a side view of a main part in a crankcase of an internal combustion engine into which a transmission according to a first embodiment of the present invention is incorporated.

FIG. 1 is a side view of a main part in a crankcase 1 of an internal combustion engine into which the transmission T1 is incorporated. FIG. 2 is a development sectional view as seen from arrows II in FIG. 1.

Note that, in the description of this specification, the front-rear and the right-left directions follow the normal standard in which an advancing direction of a motorcycle according to this embodiment is defined as a front direction, and the reference signs "FR", "RR", "LH", and "RH" in the drawings denote a front direction, a rear direction, a left-hand direction, and a right-hand direction, respectively.

A crankshaft, etc. of the internal combustion engine, which are not shown in the drawing, are disposed in a front part of the crankcase 1, whereas the transmission T1 is provided rearward thereof.

The transmission T1 includes a main shaft 10 as a driving shaft and a counter shaft 20 as a driven shaft. The main shaft 10 and the counter shaft 20 are rotatably disposed between right and left side walls of the crankcase 1, in the condition of being directed parallel to each other in the right-left direction.

Rotation power of the crankshaft is transmitted to the main shaft 10 via a clutch mechanism (not shown). The counter shaft 20 is disposed behind and slightly below the main shaft 10.

The main shaft 10 axially supports a drive gear train Gm, whereas the counter shaft 20 axially supports a driven gear train Gc. The drive gear train Gm and the driven gear train Gc mesh with each other by the respective gears.

A shift drum 40 is rotatably and axially supported by the right and the left side walls of the crankcase 1, under the main shaft 10.

Figure 3:
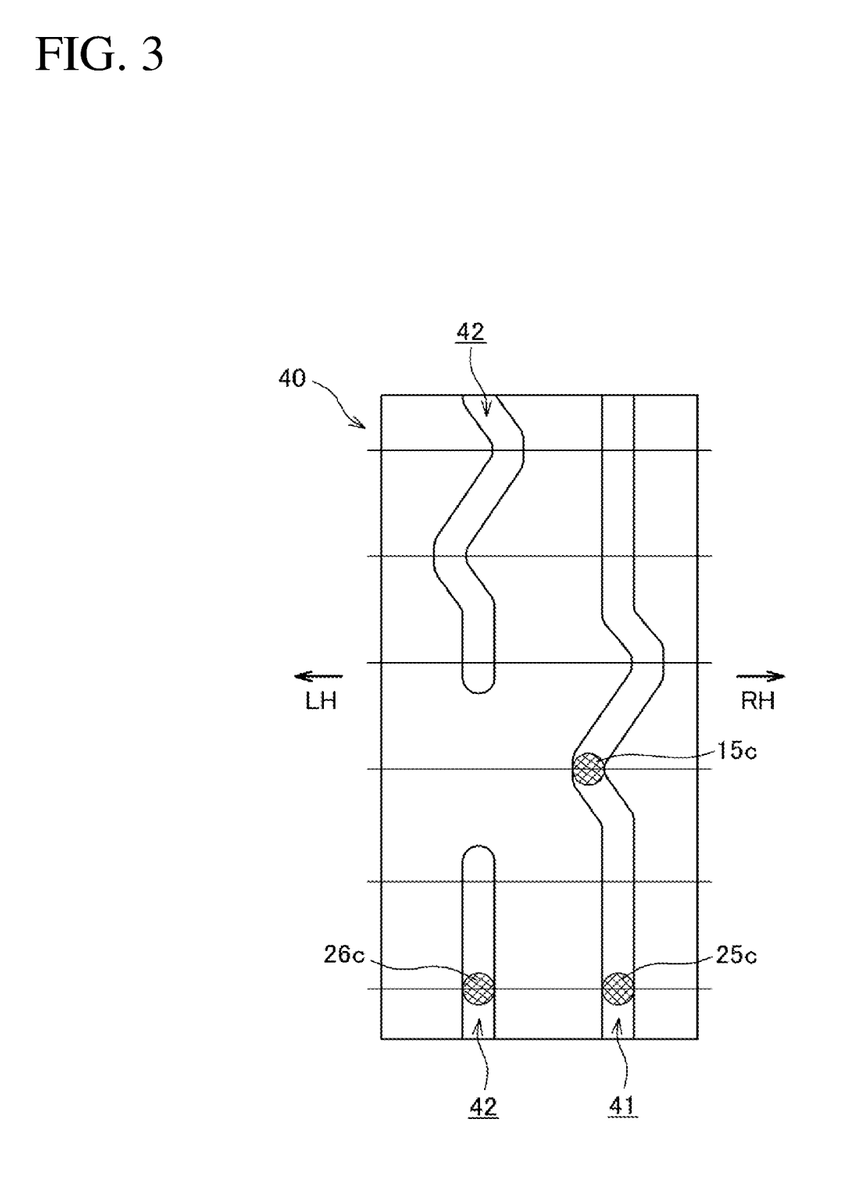
FIG. 3 is a development view of an outer circumferential surface of a shift drum.

With reference to FIG. 3 showing a development view of an outer circumferential surface of the shift drum 40, two lead grooves 41 and 42 are laterally formed side by side in such a manner as to extend in the circumferential direction, on the outer circumferential surface of the shift drum 40.

The lead groove 41 on the right side is a shared lead groove 41 formed of two different lead groove parts that are mutually dislocated in the circumferential direction.

The lead groove 42 on the left side is composed of one lead groove part.

A first fork shaft 30 is disposed between the right and the left side walls of the crankcase 1 in the condition of being directed in the right-left direction, obliquely above and forward of the shift drum 40 and under the main shaft 10.

A second fork shaft 35 is disposed between the right and the left side walls of the crankcase 1 in the condition of being directed in the right-left direction, behind the shift drum 40.

It is assumed that the shaft center line of the main shaft 10 is represented as a "main shaft center line Lm", the shaft center line of the counter shaft 20 is represented as a "counter shaft center line Lc", the shaft center line of the first fork shaft 30 is represented as a "first fork shaft center line Lf1", the shaft center line of the second fork shaft 35 is represented as a "second fork shaft center line Lf2", and the rotation center line of the cylindrical shift drum 40 is represented as a "drum rotation center line Ld".

The drive gear train Gm, which is axially supported by the main shaft 10, includes a first shifter gear Ms that is spline-fitted to the main shaft 10 so as to rotate together with the main shaft 10 and to be axially movable. A dog clutch 12 is formed so as to be able to be engaged and disengaged between the first shifter gear Ms and an adjacent drive gear.

Note that the drive gear adjacent to the first shifter gear Ms is rotatable at an axially fixed position of the main shaft 10.

The driven gear train Gc, which is axially supported by the counter shaft 20, includes a second shifter gear Cs2 and a third shifter gear Cs3 that are spline-fitted to the counter shaft 20 so as to rotate together with the counter shaft 20 and to be axially movable. A dog clutch 12 is formed so as to be able to be engaged and disengaged between each of these shifter gears and an adjacent driven gear.

The dog clutch 12 is engaged and disengaged in accordance with axial movement of the first shifter gear Ms.

The first shifter gear Ms is moved by a first shift fork 15 that is slidably and axially supported by the first fork shaft 30.

The dog clutch 12 is engaged and disengaged in accordance with axial movement of each of the second shifter gear Cs2 and the third shifter gear Cs3.

The second shifter gear Cs2 and the third shifter gear Cs3 are respectively moved by a second shift fork 25 and a third shift fork 26 that are slidably and axially supported by the second fork shaft 35.

The first shift fork 15 has an arm 15a as a center body, and a cylindrical boss 15b is formed at a base end of the arm 15a. The cylindrical boss 15b is slidably and axially supported by the first fork shaft 30 that penetrates therethrough. The first shift fork 15 also has an engaging protrusion 15c that protrudes from the cylindrical boss 15b. The first shift fork 15 also has a pair of engaging claws 15d and 15e that are formed at top ends of the arm 15a in a separated manner.

The pair of the engaging claws 15d and 15e of the first shift fork 15 are formed into a circular arc shape and engage with a fork groove "v" that is an outer circumferential groove of the first shifter gear Ms.

The engaging claws 15d and 15e respectively have fork pushing parts B and C (parts with a dot pattern in FIG. 1) for pushing the first shifter gear Ms.

The cylindrical boss 15b of the first shift fork 15 has an overhang 15bb that slightly overhangs to a side (rearward in FIG. 1). The engaging protrusion 15c protrudes toward the drum rotation center line Ld of the shift drum 40 from a position slightly close to the overhang 15bb of the cylindrical boss 15b.

This engaging protrusion 15c of the first shift fork 15 engages with one lead groove part of the shared lead groove 41 on the right side of the shift drum 40.

The engaging protrusion 15c of the first shift fork 15 has a first fork action part A1 on which the shared lead groove 41 acts in accordance with rotation of the shift drum 40.

The first fork action part A1 is a center line of the engaging protrusion 15c.

The cylindrical boss 15b of the first shift fork 15 has a first boss center line as a cylindrical center line. The first boss center line approximately coincides with the first fork shaft center line Lf1 of the first fork shaft 30 and is therefore represented as a "first boss center line Lf1" by using a reference sign "Lf1".

With reference to FIG. 1, the first fork action part A1 exists on a line in a direction in which the engaging protrusion 15c protrudes toward the drum rotation center line Ld from the position slightly close to the overhang 15bb of the cylindrical boss 15b.

Thus, the first fork action part A1 does not exist in a plane that contains the first boss center line Lf1 of the cylindrical boss 15b of the first shift fork 15 and the drum rotation center line Ld.

That is, there is an opening angle α around the drum rotation center line Ld between the first boss center line Lf1 and the first fork action part A1.

In the first embodiment, the opening angle α is 3 degrees.

The second shift fork 25 has an arm 25a as a center body, and a cylindrical boss 25b is formed at a base end of the arm 25a. The cylindrical boss 25b is slidably and axially supported by the second fork shaft 35 that penetrates therethrough. The second shift fork 25 also has an engaging protrusion 25c that protrudes from the cylindrical boss 25b toward the drum rotation center line Ld. The second shift fork 25 also has a pair of engaging claws 25d and 25e that are formed at top ends of the arm 25a in a separated manner.

The pair of the engaging claws 25d and 25e of the second shift fork 25 are formed into a circular arc shape and engage with a fork groove "v" that is an outer circumferential groove of the second shifter gear Cs2.

The engaging claws 25d and 25e respectively have fork pushing parts B and C for pushing the second shifter gear Cs2.

The engaging protrusion 25c, which protrudes from the cylindrical boss 25b of the second shift fork 25, engages with one lead groove part of the shared lead groove 41 on the right side of the shift drum 40.

The engaging protrusion 25c of the second shift fork 25 has a second fork action part A2 on which the shared lead groove 41 acts in accordance with rotation of the shift drum 40.

The second fork action part A2 is a center line of the engaging protrusion 25c.

The second fork action part A2 exists in a plane containing a second boss center line (second fork shaft center line of the second fork shaft 35) Lf2 that is a cylindrical center line of the cylindrical boss 25b of the second shift fork 25 and containing the drum rotation center line Ld.

The third shift fork 26 has the same shape as the second shift fork 25. The third shift fork 26 has an arm 26a as a center body, and a cylindrical boss 26b at a base end of the arm 26a is slidably and axially supported by the second fork shaft 35 that penetrates therethrough. The third shift fork 26 also has an engaging protrusion 26c that protrudes from the cylindrical boss 26b. The third shift fork 26 also has a pair of engaging claws 26d and 26e that are formed at top ends of the arm 26a in a separated manner.

The engaging protrusion 26c protrudes from the cylindrical boss 26b of the third shift fork 26 toward the drum rotation center line Ld of the shift drum 40 and engages with the lead groove 42 on the left side of the shift drum 40.

The pair of the engaging claws 26d and 26e of the third shift fork 26 are formed into a circular arc shape and engage with a fork groove "v" that is an outer circumferential groove of the third shifter gear Cs3.

The engaging claws 26d and 26e respectively have fork pushing parts B and C for pushing the third shifter gear Cs3.

The engaging protrusion 15c of the first shift fork 15 and the engaging protrusion 25c of the second shift fork 25, which engage with the shared lead groove 41 of the shift drum 40, engage with the two different lead groove parts, which are formed on the outer circumferential surface of the shift drum 40 in a manner mutually dislocated in the circumferential direction, of the shared lead groove 41. Thus, as shown in FIG. 1, an opening angle θ between the engaging protrusions around the drum rotation center line Ld is formed between the first fork action part A1 of the engaging protrusion 15c of the first shift fork 15 and the second fork action part A2 of the engaging protrusion 25c of the second shift fork 25.

The opening angle θ between the engaging protrusions is a multiple of 60 degrees due to setting of a shift feed angle of the shift drum 40, and in the first embodiment, it is designed to be 120 degrees.

In this embodiment, there is an opening angle α around the drum rotation center line Ld between the first boss center line Lf1 and the first fork action part A1. That is, the first boss center line Lf1 is offset from the first fork action part A1 by the opening angle α. Thus, although the opening angle θ between the engaging protrusions is set to 120 degrees, the position of the first boss center line Lf1 can be freely designed without being limited by the opening angle between the engaging protrusions of 120 degrees. Herein, the first boss center line Lf1 is provided at a position offset from the first fork action part A1 by the opening angle α (=3 degrees).

That is, the opening angle α is provided between the first boss center line Lf1 and the first fork action part A1 around the drum rotation center line Ld, and this opening angle α is varied. This makes it possible to freely set the position of the first boss center line Lf1 without being limited by the opening angle θ between the engaging protrusions. As a result, the degree of freedom of design of an internal combustion engine and the degree of freedom of layout of shift forks are improved.

Figure 2:
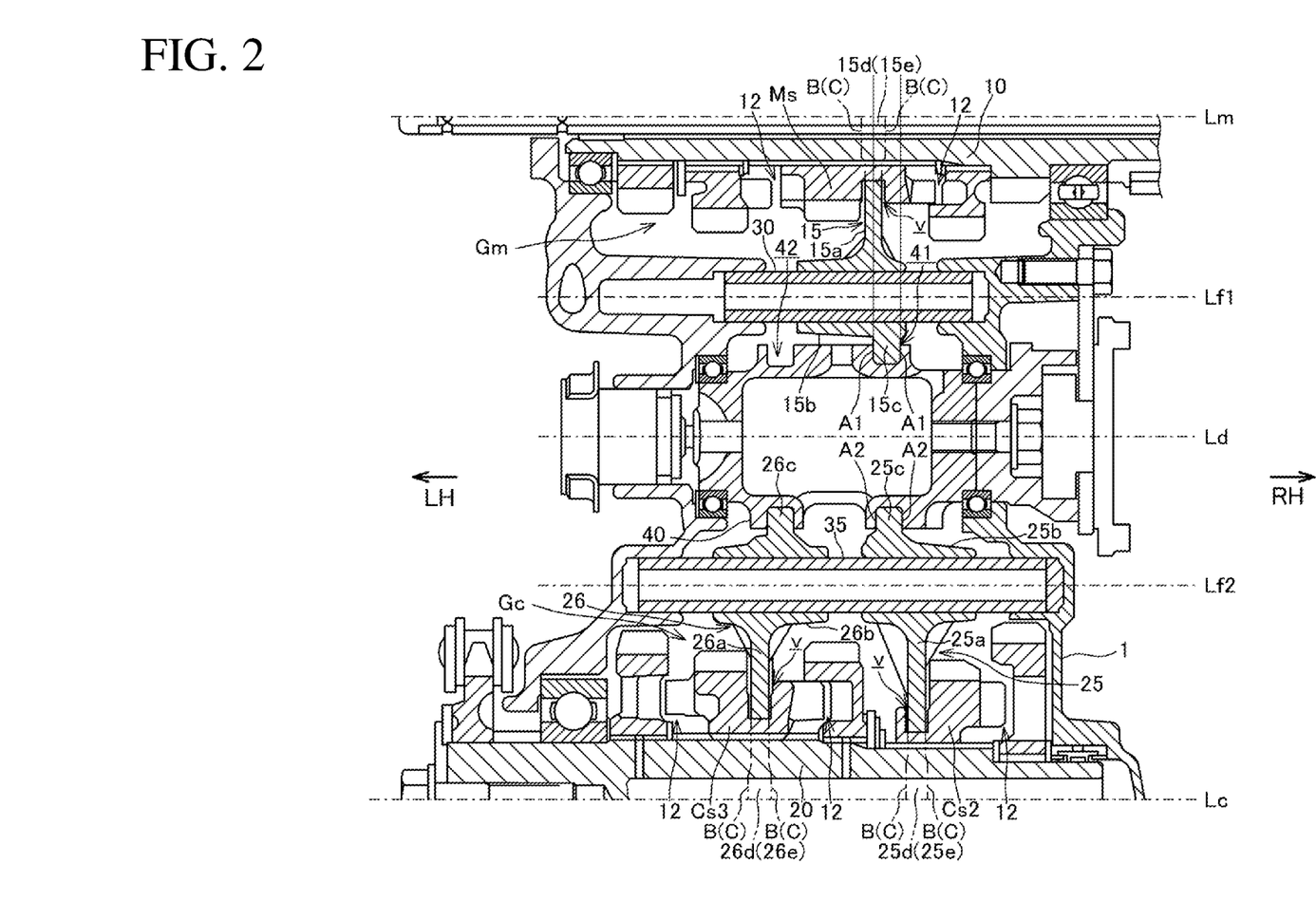
FIG. 2 is a development sectional view as seen from arrows II in FIG. 1.

With reference to FIG. 2, in the first shift fork 15, the fork pushing parts B and C of the engaging claws 15d and 15e for pushing the first shifter gear Ms at least partially overlap the engaging protrusion 15c in position in the line direction of the first boss center line Lf1.

The first shift fork 15 has a very small offset amount in the line direction of the first boss center line Lf1 of the fork pushing parts B and C for pushing the first shifter gear Ms, relative to the fork action part A1 of the engaging protrusion 15c, on which the shared lead groove 41 of the shift drum 40 acts. This structure suppresses occurrence of partial stress concentration, resulting in improving shift operation characteristics.

Figure 4:
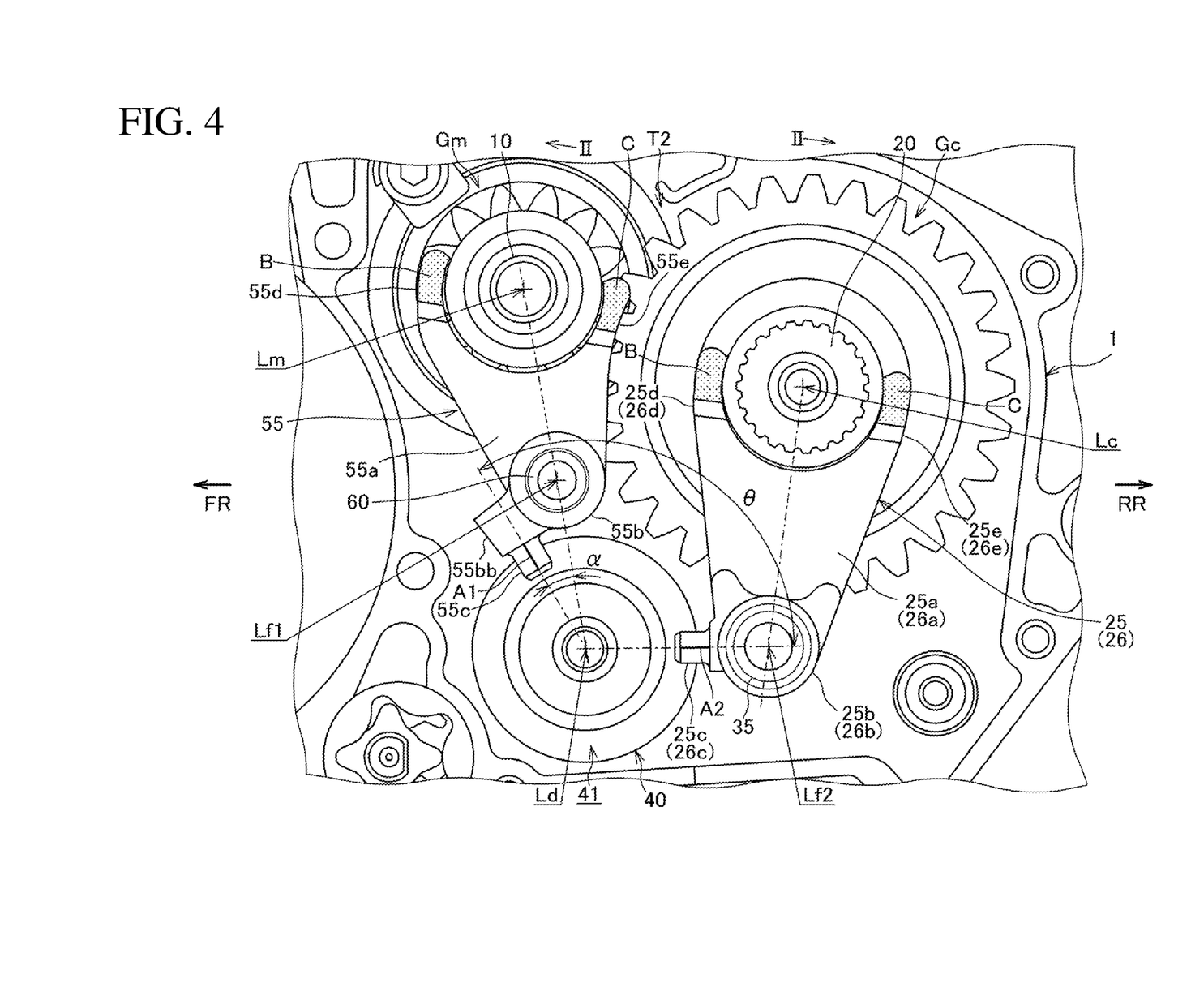
FIG. 4 is a side view of a main part in a crankcase of an internal combustion engine into which a transmission according to a second embodiment is incorporated.

Next, a second embodiment will be described as another embodiment, based on FIG. 4.

A transmission T2 of the second embodiment differs from the transmission T1 in the shape of a first shift fork 55 and the disposition of a first fork shaft 60. The first shift fork 55 and the first fork shaft 60 respectively correspond to the first shift fork 15 and the first fork shaft 30 of the transmission T1 of the first embodiment. Other components of the transmission T2 are the same as those of the transmission T1 of the first embodiment, and therefore, these same components are denoted by the same reference signs.

In the second embodiment, the first fork shaft center line (first boss center line) Lf1 of the first fork shaft 60 is on the same straight line as a straight line containing the drum rotation center line Ld and the shifter center line (main shaft center line) Lm as the axial center line of the first shifter gear Ms.

Note that the shifter center line approximately coincides with the main shaft center line Lm and is therefore represented as a "shifter center line Lm" by using a reference sign "Lm".

The first shift fork 55 has an arm 55a as a center body, and a cylindrical boss 55b is formed at a base end of the arm 55a. The cylindrical boss 55b is slidably and axially supported by the first fork shaft 60 that penetrates therethrough. The first shift fork 55 also has an engaging protrusion 55c that protrudes from an overhang 55bb toward the drum rotation center line Ld of the shift drum 40. The overhang 55bb overhangs to a side (front side in FIG. 4) of the cylindrical boss 55b. The first shift fork 55 also has a pair of engaging claws 55d and 55e that are formed at top ends of the arm 55a in a separated manner.

The pair of the engaging claws 55d and 55e of the first shift fork 55 are formed into a circular arc shape and engage with a fork groove "v" that is an outer circumferential groove of the first shifter gear Ms.

The engaging claws 55d and 55e respectively have fork pushing parts B and C for pushing the first shifter gear Ms.

The engaging protrusion 55c of the first shift fork 55 engages with one lead groove part of the shared lead groove 41 on the right side of the shift drum 40.

The engaging protrusion 55c of the first shift fork 55 has a first fork action part A1 on which the shared lead groove 41 acts in accordance with rotation of the shift drum 40.

There is an opening angle α around the drum rotation center line Ld between the first boss center line Lf1 and the first fork action part A1.

In the second embodiment, the opening angle α is 21 degrees.

In the second embodiment, an opening angle θ between the engaging protrusions around the drum rotation center line Ld is formed between the first fork action part A1 of the engaging protrusion 55c of the first shift fork 55 and the second fork action part A2 of the engaging protrusion 25c of the second shift fork 25. This opening angle θ between the engaging protrusions is designed to be 120 degrees as in the case of the first embodiment.

The opening angle α is provided between the first boss center line Lf1 and the first fork action part A1 around the drum rotation center line Ld, and this opening angle α is varied. This makes it possible to freely set the position of the first boss center line Lf1 without being limited by the opening angle θ (=120 degrees) between the engaging protrusions. As a result, the degree of freedom of design of an internal combustion engine and the degree of freedom of layout of shift forks are improved.

In the second embodiment, in the first shift fork 55, the opening angle α that is set to 21 degrees enables disposing the first boss center line Lf1 on the same straight line as the straight line containing the drum rotation center line Ld and the shifter center line (main shaft center line) Lm.

That is, the shifter center line Lm as the axial center line of the first shifter gear Ms, the first boss center line Lf1, and the drum rotation center line Ld are on the same straight line. Thus, although there is an opening angle α around the drum rotation center line Ld between the first boss center line Lf1 and the first fork action part A1, a force acting on the first fork action part A1 of the engaging protrusion 55c of the first shift fork 55 by the shared lead groove 41 of the shift drum 40 is efficiently transmitted to the first shifter gear Ms by the fork pushing parts B and C via the cylindrical boss 55b, which centers on the first boss center line Lf1 on the same straight line as the straight line containing the drum rotation center line Ld and the shifter center line Lm.

The first boss center line Lf1 is disposed in an area of the opening angle θ between the engaging protrusions around the drum rotation center line Ld, which is between the first fork action part A1 and the second fork action part A2. Thus, the first fork shaft 60 and the first shift fork 55 are provided in the area of the opening angle θ between the engaging protrusions, whereby the transmission mechanism has a compact layout as a whole.

Figure 5:
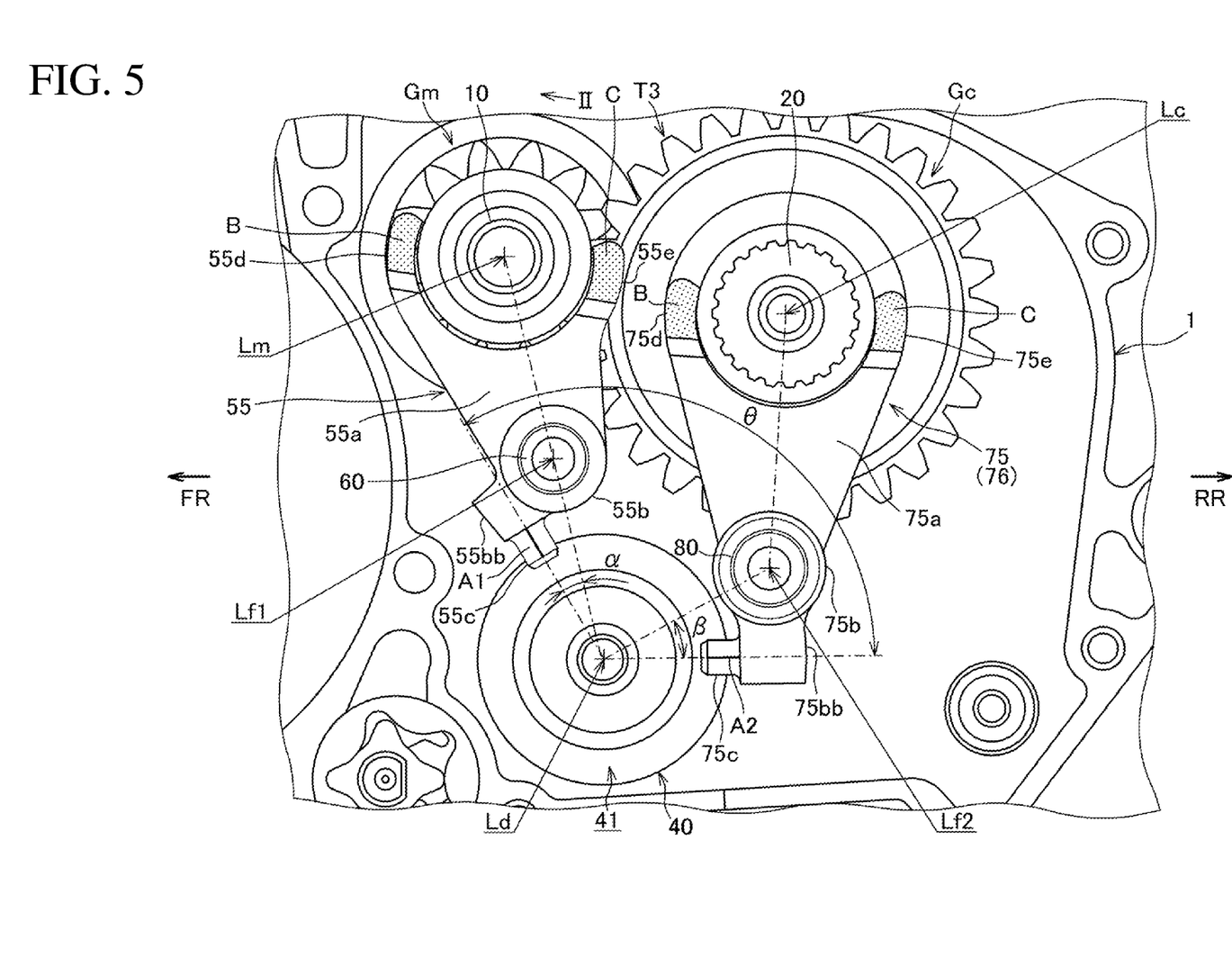
FIG. 5 is a side view of a main part in a crankcase of an internal combustion engine into which a transmission according to a third embodiment is incorporated.

Next, a third embodiment will be described as yet another embodiment, based on FIG. 5.

A transmission T3 of the third embodiment differs from the transmission T2 in the shapes of a second shift fork 75 and a third shift fork 76 and the disposition of a second fork shaft 80. The second shift fork 75, the third shift fork 76, and the second fork shaft 80 respectively correspond to the second shift fork 25, the third shift fork 26, and the second fork shaft 35 of the transmission T2 of the second embodiment. Other components of the transmission T3 are the same as those of the transmission T2 of the second embodiment, and therefore, these same components are denoted by the same reference signs.

In the third embodiment, the second fork shaft center line (second boss center line) Lf2 of the second fork shaft 80 is positioned obliquely above and rearward of the drum rotation center line Ld and under the shifter center line (counter shaft center line) Lc as the axial center line of the second shifter gear Cs2.

Note that the shifter center line approximately coincides with the counter shaft center line Lc and is therefore represented as a "shifter center line Lc" by using a reference sign "Lc".

The second shift fork 75 has an arm 75a as a center body, and a cylindrical boss 75b is formed at a base end of the arm 75a. The cylindrical boss 75b is slidably and axially supported by the second fork shaft 80 that penetrates therethrough. The second shift fork 75 also has an engaging protrusion 75c that protrudes from an overhang 75bb toward the drum rotation center line Ld. The overhang 75bb overhangs to a side (lower side in FIG. 5) of the cylindrical boss 75b. The second shift fork 75 also has a pair of engaging claws 75d and 75e that are formed at top ends of the arm 75a in a separated manner.

The pair of the engaging claws 75d and 75e of the second shift fork 75 are formed into a circular arc shape and engage with a fork groove "v" of the second shifter gear Cs2.

The engaging claws 75d and 75e respectively have fork pushing parts B and C for pushing the second shifter gear Cs2.

The engaging protrusion 75c of the second shift fork 75 engages with one lead groove part of the shared lead groove 41 on the right side of the shift drum 40.

The engaging protrusion 75c of the second shift fork 75 has a second fork action part A2 on which the shared lead groove 41 acts in accordance with rotation of the shift drum 40.

There is an opening angle β around the drum rotation center line Ld between the second boss center line Lf2 and the second fork action part A2.

In the third embodiment, the opening angle β is 28 degrees.

Note that the third shift fork 76 has approximately the same shape as the second shift fork 75.

In the third embodiment, an opening angle θ between the engaging protrusions around the drum rotation center line Ld is formed between the first fork action part A1 of the engaging protrusion 55c of the first shift fork 55 and the second fork action part A2 of the engaging protrusion 75c of the second shift fork 75. This opening angle θ between the engaging protrusions is designed to be 120 degrees as in the cases of the first and the second embodiments.

Both of the first boss center line Lf1 and the second boss center line Lf2 are disposed in an area of the opening angle θ between the engaging protrusions around the drum rotation center line Ld, which is between the first fork action part A1 and the second fork action part A2.

Thus, the first fork shaft 60 having the first boss center line Lf1 as a center line, the second fork shaft 80 having the second boss center line Lf2 as a center line, and each of the bodies of the first shift fork 55 and the second shift fork 75, are provided in the area of the opening angle θ between the engaging protrusions, whereby the transmission mechanism has a compact layout as a whole.

The opening angle α is provided between the first boss center line Lf1 and the first fork action part A1 around the drum rotation center line Ld, whereas the opening angle β is provided between the second boss center line Lf2 and the second fork action part A2 around the drum rotation center line Ld, and these opening angles α and β are varied. This makes it possible to freely set the positions of the first boss center line Lf1 and the second boss center line Lf2 without being limited by the opening angle θ (=120 degrees)

between the engaging protrusions. As a result, the degree of freedom of design of an internal combustion engine and the degree of freedom of layout of shift forks are more improved.

Although transmissions according to three embodiments of the present invention are described above, embodiments of the present invention are not limited to the foregoing embodiments and also include those implemented in various forms within the gist of the present invention.

Although the three embodiments according to the present invention employ a gear as the shifter gear that is moved by being pushed by the shift fork, a shifter may be used instead of a gear. This shifter may simply rotate together with a shaft and be axially movable, and this shifter may be engaged and disengaged with an adjacent gear by a dog clutch.

REFERENCE SIGNS LIST

T1 . . . transmission
Gm . . . drive gear train
Gc . . . driven gear train
Ms . . . first shifter gear
Cs2 . . . second shifter gear
Cs3 . . . third shifter gear
Lm . . . main shaft center line (shifter center line)
Lc . . . counter shaft center line (shifter center line)
Lf1 . . . first fork shaft center line (first boss center line)
Lf2 . . . second fork shaft center line (second boss center line)
Ld . . . drum rotation center line
A1 . . . first fork action part
A2 . . . second fork action part
B . . . fork pushing part
C . . . fork pushing part
1 . . . crankcase
10 . . . main shaft
12 . . . dog clutch
15 . . . first shift fork
15a . . . arm
15b . . . cylindrical boss
15bb . . . overhang
15c . . . engaging protrusion
15d . . . engaging claw
15e . . . engaging claw
20 . . . counter shaft
25 . . . second shift fork
25a . . . arm
25b . . . cylindrical boss
25c . . . engaging protrusion
25d . . . engaging claw
25e . . . engaging claw
26 . . . third shift fork
26a . . . arm
26b . . . cylindrical boss
26c . . . engaging protrusion
26d . . . engaging claw
26e . . . engaging claw
30 . . . first fork shaft
35 . . . second fork shaft
40 . . . shift drum
41 . . . shared lead groove
42 . . . lead groove
T2 . . . transmission
55 . . . first shift fork
55a . . . arm
55b . . . cylindrical boss
55bb . . . overhang
55c . . . engaging protrusion
55d . . . engaging claw
55e . . . engaging claw
60 . . . first fork shaft
T3 . . . transmission
75 . . . second shift fork
75a . . . arm
75b . . . cylindrical boss
75bb . . . overhang
75c . . . engaging protrusion
75d . . . engaging claw
75e . . . engaging claw
76 . . . third shift fork
80 . . . second fork shaft

What is claimed is:

1. A transmission configured to transmit power from a driving shaft to a driven shaft at a gear ratio that is determined by a mutual engagement state of gear trains, the gear trains axially supported respectively by the driving shaft and the driven shaft that are arranged in parallel to each other, the transmission comprising:
   shifters axially supported respectively by the driving shaft and the driven shaft, the shifters configured to rotate together with the respective shafts and be axially movable;
   dog clutches configured to engage and disengage the shifters and gears adjacent to the respective shifters;
   shift forks configured to push and axially move the respective shifters, each shift fork having an engaging protrusion;
   fork shafts axially supporting the shift forks in an axially movable manner; and
   a shift drum having multiple lead grooves on a cylindrical outer circumferential surface, the lead grooves engaging with the engaging protrusions of the shift forks, the shift drum configured to rotate to axially move the shift forks,
   wherein at least one of the lead grooves of the shift drum is a shared lead groove that engages with the engaging protrusions of two of the shift forks, and
   wherein the engaging protrusion of a first shift fork engaging with the shared lead groove is configured to form a first opening angle between a first line from a drum rotation center line of the shift drum to a boss center line as a cylindrical center line of a cylindrical boss that is axially supported by the fork shaft of the first shift fork and a second line extending from a central line of the engaging protrusion of the first shift fork to the drum rotation center line of the shift drum.

2. The transmission according to claim 1, wherein the first shift fork has an arm,
   wherein the engaging protrusion of the first shift fork protrudes from the cylindrical boss at a base end of the arm,
   wherein the first shift fork has engaging claws that are formed at top ends of the arm in a separated manner and that engage with a fork groove as an outer circumferential groove of the shifter, and
   wherein the engaging claws respectively have fork pushing parts for pushing the shifter, and the fork pushing parts at least partially overlap the engaging protrusion in position in a line direction of the boss center line.

3. The transmission according to claim 2, wherein a shifter center line as an axial center line of the shifter, the boss center line of the first shift fork, and the drum rotation center line are on a same straight line.

4. The transmission according to claim 2, wherein a second shift fork engages with the shared lead groove, and wherein the second shift fork has a second opening angle formed by a third line extending between the drum rotation center line and a second boss center line of a cylindrical boss of the second shift fork and a fourth line extending between of a central line of the engaging protrusion of the second shift fork and the drum rotation center line of the shift drum.

5. The transmission according to claim 1, wherein a shifter center line as an axial center line of the shifter, the boss center line, and the drum rotation center line are on a same straight line.

6. The transmission according to claim 5, wherein a second shift fork engages with the shared lead groove, and wherein the second shift fork has a second opening angle formed by a third line extending between the drum rotation center line and a second boss center line of a cylindrical boss of the second shift fork and a fourth line extending between of a central line of the engaging protrusion of the second shift fork and the drum rotation center line of the shift drum.

7. The transmission according to claim 1, wherein a second shift fork engages with the shared lead groove, and wherein the second shift fork has a second opening angle formed by a third line extending between the drum rotation center line and a second boss center line of a cylindrical boss of the second shift fork and a fourth line extending between of a central line of the engaging protrusion of the second shift fork and the drum rotation center line of the shift drum.

8. The transmission according to claim 7, wherein at least one of the first boss center line and the second boss center line is disposed in an area of a third opening angle between the second line and the fourth line.

\* \* \* \* \*